United States Patent
Cowan et al.

[19]
[11] Patent Number: 5,975,590
[45] Date of Patent: Nov. 2, 1999

[54] HIGH PRESSURE FITTING

[75] Inventors: Norman Cowan, Fremont, Calif.; Shannon Hart, Austin, Tex.; Raymond Gristi, San Jose, Calif.

[73] Assignee: Applied Materials, Inc., Santa Clara, Calif.

[21] Appl. No.: 09/024,679

[22] Filed: Feb. 17, 1998

[51] Int. Cl.⁶ .............................. F16L 41/00; F16L 43/00; F16L 47/00
[52] U.S. Cl. .................. 285/133.11; 285/179; 285/288.1
[58] Field of Search .................. 285/179, 288.1, 285/125.1, 133.11, 228

[56] References Cited

U.S. PATENT DOCUMENTS

| | | | |
|---|---|---|---|
| 2,157,274 | 5/1939 | Williams | 285/133.11 |
| 2,555,256 | 5/1951 | Tyson | 285/288.1 |
| 4,363,504 | 12/1982 | DeFeo et al. | 285/47 |
| 4,969,980 | 11/1990 | Yoshioka et al. | 204/28 |
| 5,890,747 | 4/1999 | Brockhage | 285/288.1 X |

*Primary Examiner*—Terry Lee Melius
*Assistant Examiner*—James M. Hewitt
*Attorney, Agent, or Firm*—Dugan & Dugan

[57] ABSTRACT

A high pressure fitting configured to be weldingly coupled to high pressure tubing is provided. The high pressure fitting and/or the tubing welded thereto may be chamfered to provided a smoother welded joint. The interior surface finish of the fitting is smoothed via an abrasive fluid flowed through the fitting's fluid passageway. In fittings comprising a corner, the inner edge of the corner may be rounded by forcibly flowing an abrasive fluid through the fitting. Electropolishing further smoothes the interior surfaces. The inventive fitting allows flow system tolerancing to be tightly controlled by determining a desired distance between two high pressure fittings to be coupled, and adjusting the desired distance by a welded length variable.

13 Claims, 5 Drawing Sheets

HIGH PRESSURE FITTING

BACKGROUND OF THE INVENTION

The present invention relates generally to the field of the high pressure fittings and specifically to fittings that supply ultra clean high pressure gas for use in semiconductor processing.

High pressure processing of semiconductor devices provides improved filling of vias and other high aspect ratio surface features. However the equipment costs associated with machining and assembling the fittings that deliver high pressure fluid (e.g., high pressure gases) to a processing chamber, and the down time associated with fitting repair, reduces the desirability of high pressure processing.

In order to understand the significance of the present invention, it is first necessary to understand conventional high pressure fitting designs. FIG. 1 shows a side elevational view representative of a conventional high pressure fitting 11, a high pressure tube 13 and a coupling assembly 15 for coupling the high pressure tube 13 to the high pressure fitting 11. Within FIG. 1 all parts are shown in section to facilitate explanation of their interior surface features.

The high pressure fitting 11 comprises a fluid passageway 17 having an abrupt direction change (i.e., a corner 19) having an inner edge 21a and an outer edge 21b; and a cavity having a threaded interior surface (i.e., threaded cavity 23). The fluid passageway 17 has a chamfered region 25 that connects the threaded cavity 23. Similarly the high pressure tube 13 has a coned end 27 with a chamfer that corresponds to the chamfer of the fluid passageway 17's chamfered region 25. A fluid tight seal is formed between the high pressure fitting 11 and the high pressure tube 13 which (because they are both metal parts such as stainless steel) exhibit metal to metal deformation when forced against each other as described below. The high pressure tube 13 further comprises a threaded region 29 for mating with the coupling assembly 15.

The coupling assembly 15 comprises a nut 31 and a collar 32. The interior surface (not shown) of the collar 32 is threaded so as to threadingly engage the threaded region 29 of the high pressure tube 13.

The nut 31 has openings at both of its ends and a continuous passageway therebetween such that the nut 31 may be slidably mounted on the high pressure tube 13. The nut 31 has an interior surface profile that comprises a first interior region 33 having an interior diameter sized to receive the collar 32 with minimum clearance, and a second interior region 35 having an interior diameter sized to receive the high pressure tube 13 with a small clearance. A sloped region 37 on the interior of the nut 31, which matingly corresponds to a chamfer 39 on the collar 32, transitions between the first and second interior regions 33, 35. The exterior surface of the nut 31 comprises an exterior threaded region 40 and a sextagonal head region 41.

In operation, to assemble a flow system the nut 31 is slid over the high pressure tube 13 and the collar 32 is then threaded on the threaded region 29 of the high pressure tube 13, and the nut 31 is slid toward the collar 32 until the collar 32 is completely recessed within the first interior region 33 of the nut 31. The exterior threaded region 40 of the nut 31 is then screwed into the threaded cavity 23 of the high pressure fitting 11. Because the interior region 33 of the nut 31 presses against the collar 32, the collar 32, which is threadingly coupled to the high pressure tube 13, forces the coned end 27 of the high pressure tube 13 against the chamfered region 25 of the high pressure fitting 11, forming a fluid tight seal therebetween.

Sufficient threaded engagement must exist between the exterior threaded region 40 and the threaded cavity 23 of the high pressure fitting 11 to withstand the forces applied thereto by the high pressure flow which is transmitted therethrough. If the collar 32 is threaded onto the high pressure tube 13 too far from the chamfered end 27 (e.g., too far in the direction of the arrow "A" of FIG. 1) the nut 31 will not be able to move far enough toward the high pressure fitting 11 (e.g., far enough in the direction of the arrow "B" of FIG. 1) to achieve sufficient threaded engagement therebetween. Additionally the angle of the chamfered end 27, which may vary from tube to tube, controls the depth with which the high pressure tube 13 extends into the fluid passageway 17 of the high pressure fitting 11, and thus controls the overall length of the assembled high pressure fitting 11 and the high pressure tube 13 (i.e., the fitting/tube assembly).

In order to form a flow system the assembly process described above is repeated. That is, another coupling assembly 15 may be slid onto another high pressure tube 13, assembled, and screwed into an additional threaded cavity (not shown) within the high pressure fitting 11, and/or an additional collar 32 can be screwed onto a second chamfered end (not shown) of the high pressure tube 13, and an additional coupling assembly assembled and screwed into an additional high pressure fitting, etc.

As discernible from the above description, due to the many interlocking parts and the numerous chamfered and/or threaded surfaces, conventional high pressure fittings are complex and costly to manufacture and assemble. Moreover, conventional high pressure fittings are inherently subject to particle generation. For example, within a corner, particles of the inner edge 21a may wear off during high pressure operation. Particles also may be generated when screwing one surface to another, or when pressing metal surfaces against one another (e.g., the coned end 27 of the high pressure tube 13 against the chamfered region 25 of the high pressure fitting 11) to achieve metal to metal deformation. Further, after repeated uses the metal surfaces of the high pressure tube 13 and the chamfered region 25 of the high pressure fitting 11 are unable to deform an amount sufficient to form a fluid tight seal. Conventional fittings and tubes therefore must be frequently replaced.

Perhaps the most troublesome feature of these conventional fittings is the difficulty associated with fitting replacement and the difficulty associated with forming a flow system which is compact and symmetrical. Due to the high cost of clean rooms, and the need to access processing chambers without obstruction, a flow system's overall size and symmetry are important. With conventional high pressure fittings, the variable length of each fitting/tube assembly renders building a symmetrical flow system nearly impossible, and removal of a single coupling assembly 15 from a high pressure fitting 11 extremely difficult and time consuming. To remove a coupling assembly 15 from a high pressure fitting 11 the coupling assembly 15 must be unscrewed and the high pressure tube 13 withdrawn from the threaded region 23 of the high pressure fitting 11, which, if achieved, will move not only the relevant coupling assembly 15 away from the high pressure fitting 11 but also will move the entire high pressure tube 13 and any other high pressure fittings 11 coupled thereto. Accordingly, once assembled a conventional high pressure flow system experiences virtual grid lock; reconfiguration or repair of a single fitting/tube joint is impossible without adjustment of numerous surrounding fitting/tube joints.

Accordingly a need exists for a new high pressure fitting which facilitates assembly and repair while being inexpensively manufacturable and less likely to generate particles.

SUMMARY OF THE INVENTION

The present invention solves the problems described above by providing a high pressure fitting having a fitting body strong enough to withstand the forces exerted by high pressure fluid, and configured to be weldingly coupled to high pressure tubing. In this manner a high pressure flow system can be quickly assembled and/or repaired (without the placement/replacement of a single fitting/tube joint affecting surrounding fitting/tube joints). Because each welded joint shrinks a known amount (i.e., a welding length variable), a compact and symmetrical valve box can be assembled by determining the actual distance between two fittings to be coupled, adjusting the actual distance by the welding length variable, and cutting a length of tube to match the adjusted distance.

In one aspect an end of the inventive fitting and/or an end of the tube welded thereto is chamfered to allow a welding blob to be at least partially recessed in the chamfer, so as to minimize and preferably to eliminate the reduction in the inside diameter caused by the welding blob.

In a further aspect the fluid passageway through the fitting comprises a corner having an inner edge which has been rounded off (i.e., a blunted edge) and an outer edge. The inner edge may be rounded by forcibly flowing an abrasive fluid through the passageway. The blunted edge of the corner results in an increased flow rate, reduced stress at the corner and reduced particle generation at the corner as the inner edge no longer wears when a high pressure fluid flows therethrough. The overall surface finish of the inventive fitting's fluid passageway also may be smoothed by flowing an abrasive fluid therethrough.

Other objects, features and advantages of the present invention will become more fully apparent from the following detailed description of the preferred embodiments, the appended claims and the accompanying drawings.

DETAILED DESCRIPTION OF THE PREFERRED EMBODIMENTS

Figure 1:
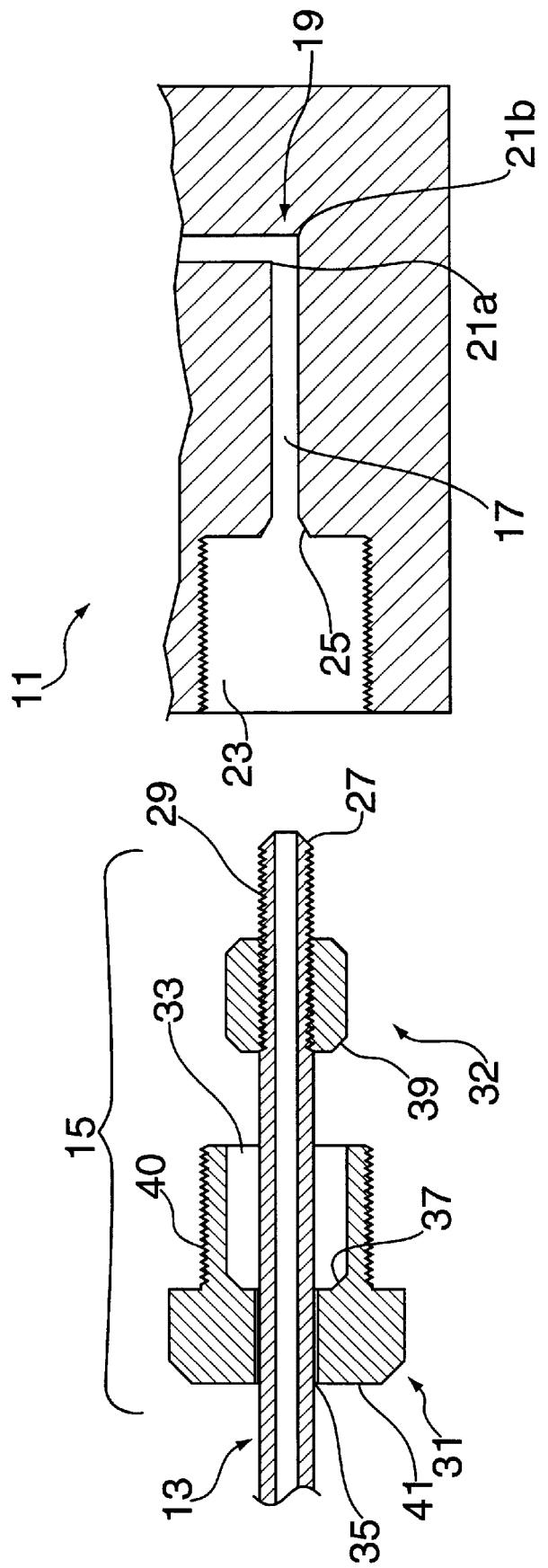
FIG. 1 is a side cross sectional view of a conventional high pressure fitting as previously described.
Figure 2C:
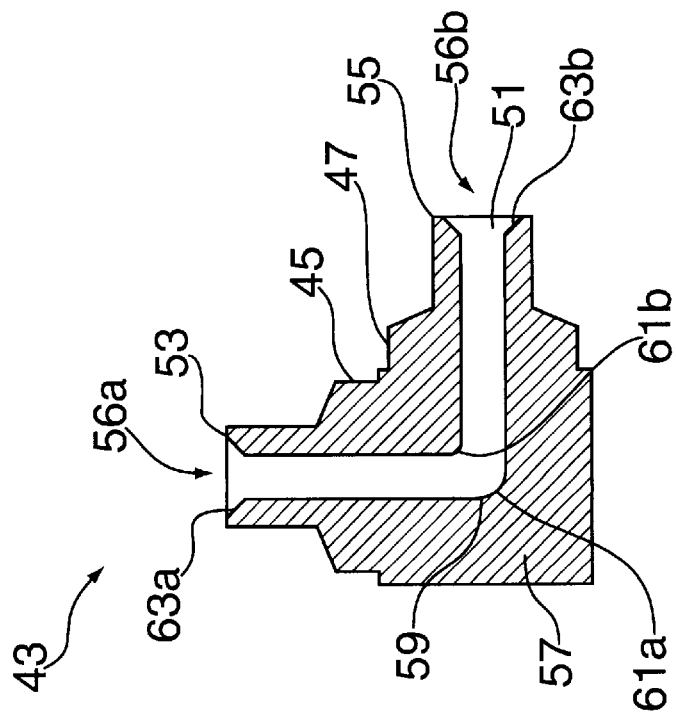
FIG. 2C is a side cross sectional view of the inventive high pressure fitting of FIG. 2A, taken along the line 2C—2C.
Figure 2B:
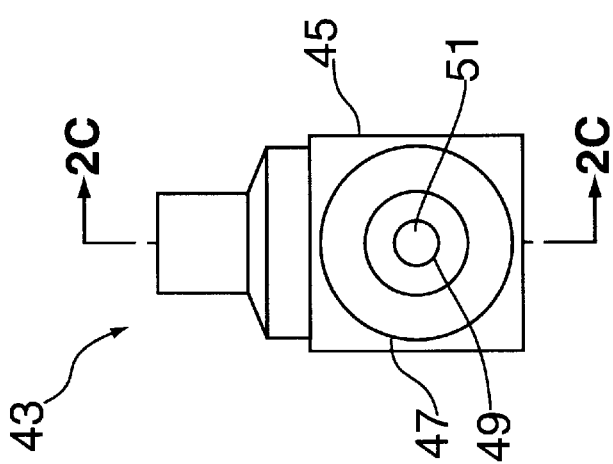
FIG. 2B is a front elevational view of the inventive high pressure fitting of FIG. 2A.
Figure 2A:
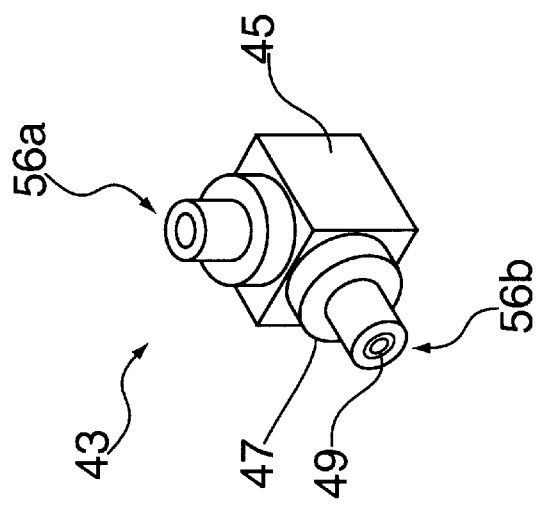
FIG. 2A is a perspective view of an inventive high pressure fitting, shown in an elbow configuration.

FIGS. 2A–C show a perspective view, a front elevational view, and a side cross sectional view (taken along line 2C—2C of FIG. 2B) of an inventive high pressure fitting 43. The inventive high pressure fitting 43 comprises a fitting body 45 having an outer surface 47 and an inner surface 49. The inner surface 49 defines a fluid passageway 51 having a first end 53 and a second end 55 through which high pressure fluid may be conducted. The first and second ends 53, 55 of the fluid passageway form first and second outlets 56a and 56b, respectively.

A material thickness 57 (indicated by cross hatching in FIG. 2C) sufficient to withstand forces exerted thereon by a high pressure fluid, extends between the outer surface 47 and the inner surface 49. Preferably the material thickness 57 which surrounds the first and second outlets 56a, 56b is configured to be welded to another object such as a stainless steel tube (not shown). That is, the outer surface 47 and the inner surface 49 nearest the first outlet 56a and the second outlet 56b of the inventive high pressure fitting 43 are not threaded or otherwise prepared for interlocking mechanical coupling (i.e., are welding surfaces).

Although the fluid passageway 51 through the high pressure fitting 43 may assume any number of shapes, including a straight line, the fluid passageway 51 preferably has a corner configured such that the first end 53 and second end 55 of the fluid passageway 51 are angularly spaced by approximately 90° (i.e., the fluid passageway 51 comprises an elbow 59). The elbow 59 has an outer edge 61a and an inner edge 61b. The inner edge 61b optionally may be rounded off (i.e., blunted) to increase the fluid flow rate through the fluid passageway 51 and/or to reduce particle generation caused by high pressure fluid stressing of the inner edge 61b of the fluid passageway 51.

The first end 53 and/or the second end 55 optionally may have a first and second chamfer 63a, 63b, respectively. The recessed areas of the chamfers 63a, 63b allow a blob (not shown) of welding material which may form during welding of either the first or second ends 53, 55 to be at least partially recessed in the respective chamfer and thus minimizes fluid flow obstruction by the blob, as further described with reference to FIGS. 3A and 3B.

Figure 3B:
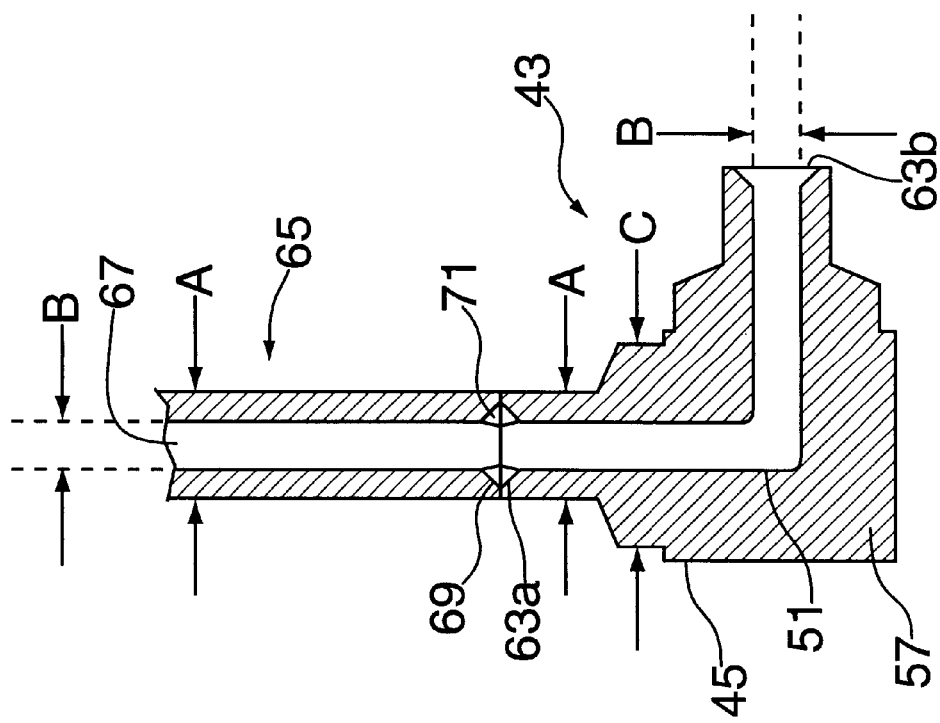
FIGS. 3A and 3B are side cross sectional views of the inventive high pressure fitting and a high pressure tube, which are useful in describing the welding thereof.
Figure 3A:
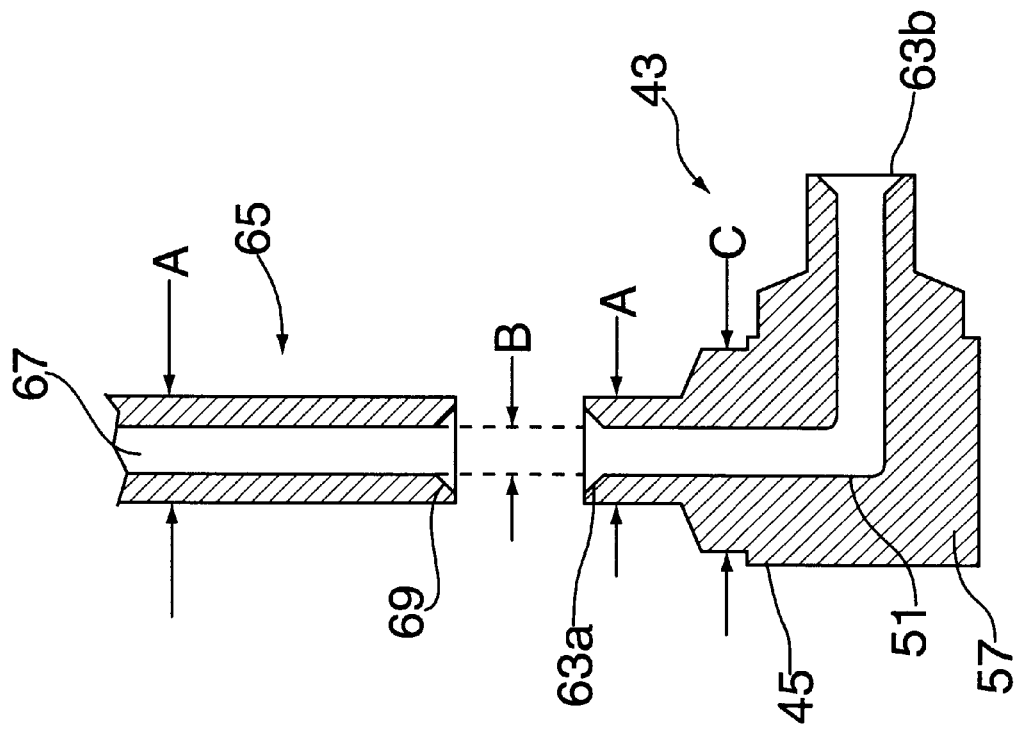
Figure 4B:
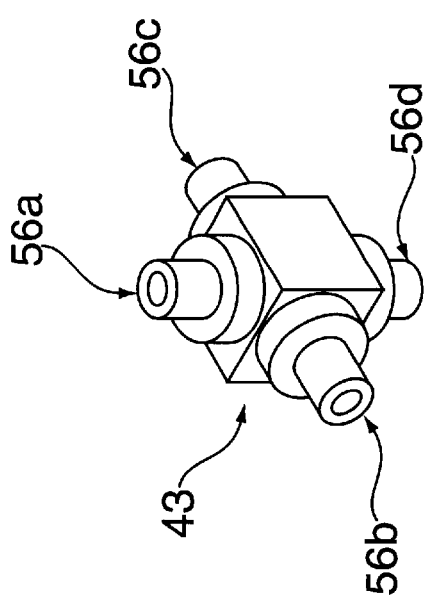
FIGS. 4A–D are perspective views showing the inventive high pressure fitting in a number of preferred embodiments.
Figure 4D:
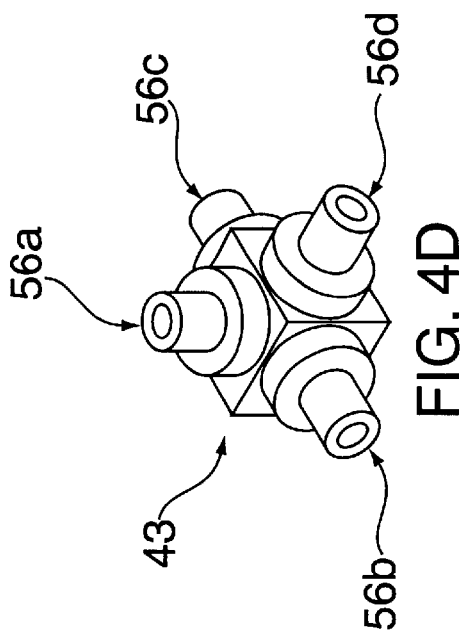
Figure 4A:
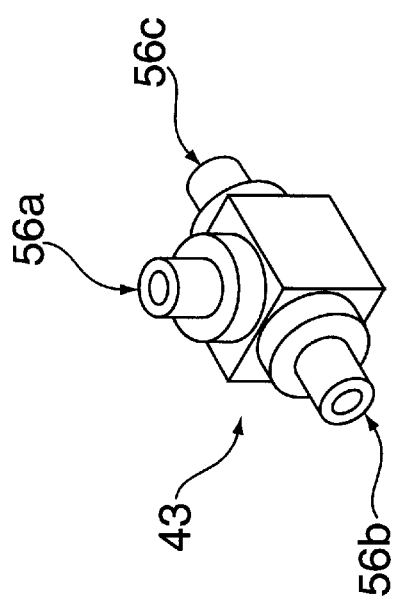
Figure 4C:
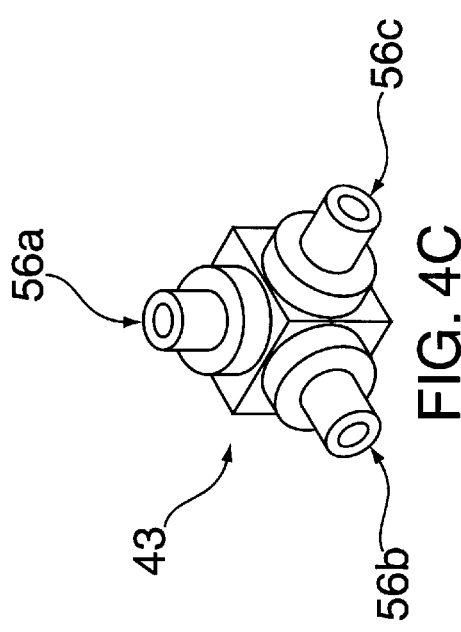

FIGS. 3A and 3B are side cross sectional views of the inventive high pressure fitting 43 and a high pressure tube 65, which are useful in describing the welding thereof. The material thickness 57 surrounding the first and second ends 53, 55 of the fitting's fluid passageway 51 preferably has an outside diameter referenced by the letter A and an inside diameter referenced by the letter B which correspond to the outside and inside diameters respectively of the tube 65. Thus, in the preferred embodiments the material thickness 57 surrounding the first end 53 and the second end 55 of the fluid passageway 51 is of smaller cross section than the cross section of the remainder of the fitting body 45, enhancing alignment of the fluid passageway 51 and of a corresponding passageway 67 within the tube 65, and improving the maneuverability of and weld quality produced by welding equipment used to couple the high pressure fitting 43 to the high pressure tube 65. Preferably the material thickness 57 surrounding the first and second ends 53, 55 of the fluid passageway 51 is configured for use with a conventional orbital welder. For added strength, a step down region "C" transitions between the cross section of material surrounding the ends of the fluid passageway 51 and the cross section of the remainder of the fitting body.

Like the first and second ends 53, 55 of the inventive fitting's fluid passageway 51, an end of the passageway 67 of the tube 65 to be welded to the high pressure fitting 43 optionally may have a chamfer 69 to likewise facilitate recess of a weld blob 71 (FIG. 3B).

When welding a conventional thick-walled stainless steel tube 65 to the high pressure fitting 43, the high pressure fitting 43 is preferably comprised of a low carbon, low sulfur steel (e.g., 316LSQ manufactured by Carpenter Steel). In order to withstand a 25,000 p.s.i. maximum fluid pressure within a 0.083 inch inside diameter central fluid passageway 51, a stainless steel fitting body 45 of 0.562 inch cross section is preferred. As will be apparent to those of ordinary skill in the art, acceptable fitting body cross sections will vary depending on the diameter of the fluid passageway 51, the pressure of the fluid transported through the fluid passageway 51, the material which comprises the fitting body 45 and other similar parameters.

With reference to FIGS. 3A and 3B, to weld the high pressure fitting 43 to the high pressure tube 65, the chamfered end of the tube 65 is placed in contact with the first chamfered end 63a of the fitting's fluid passageway, and by aligning the outer surfaces of the fitting 43 and the tube 65, the respective passageways 51, 67 are aligned. Because, aside from the chamfered end 63a, the inner and outer diameter of the material thickness 57 surrounding the first end 53 of the fitting's fluid passageway 51 corresponds to the tube 65's inner and outer diameter, the passageways 51, 67 are easily aligned. In addition to chamfering the ends of the fitting's fluid passageway, the material surrounding the ends of the fitting's fluid passageway is squared for better alignment. A continuous smooth internal passageway is therefore maintained and abrupt edges where particles may be generated are avoided. Moreover, the weld blob 71 that normally forms during welding is at least partially recessed in the region formed by the chamfers 63a and 69. Thus, the surface finish within the passageway between the high pressure fitting 43 and the tube 65 is smoother. To further smooth the surface finish of the passageway and/or to round off the inner edge 61b of the corner 59, an abrasive fluid can be flowed therethrough. Even further enhancement of the inside diameter 51 may be achieved by electropolishing.

The high pressure fitting 43 and the tube 65 are preferably butt welded to each other by using an orbital butt welder, although other welding techniques such as manual gas tungsten arc welding, etc., may be employed. Due to the material thickness 57 of the high pressure fitting 43 and the tube 65, several welding passes are typically required.

In addition to the elbow configuration shown in FIGS. 2A–C and 3A–B, the inventive high pressure fitting 43 can assume any number of configurations, including those shown in FIGS. 4A–D. Specifically, FIGS. 4A–D are perspective views of the inventive high pressure fitting 43, respectively showing a tee, cross, tribow and teebow configuration, each having one or more additional ends (e.g., outlets) 56c–d for welding to additional high pressure tubing to form a flow system such as that shown in FIG. 5.

Figure 5:
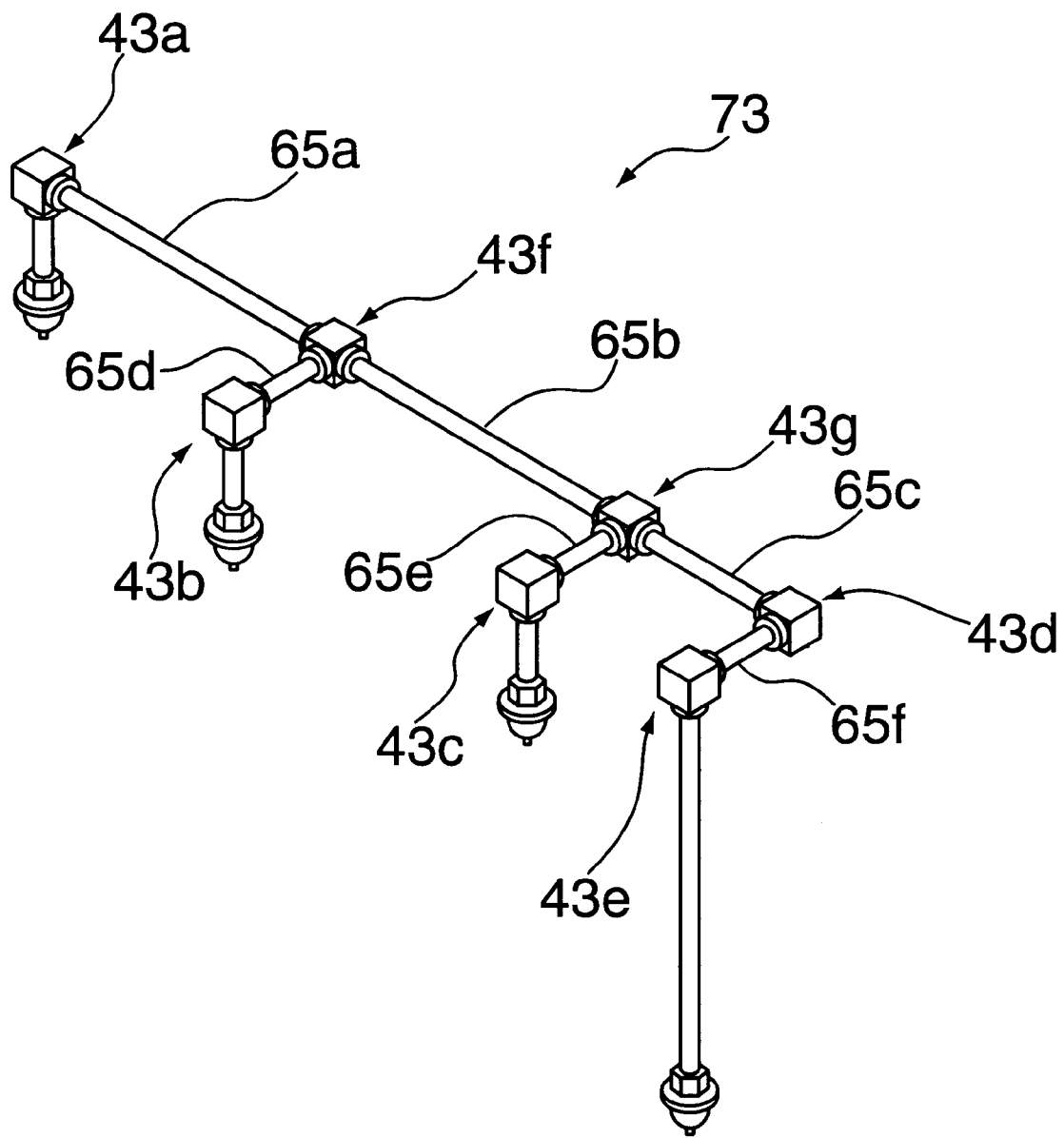
FIG. 5 is a perspective view of a flow system which employs the inventive high pressure fitting.

FIG. 5 is a perspective view of a simplified flow system 73 which employs a plurality of the inventive high pressure fittings 43a–g coupled by a plurality of high pressure tubes 65a–f. The simplified flow system 73 employs the high pressure fittings 43 in both elbow configurations (e.g., fittings 43a–e) and tee configurations (e.g., fittings 43f–g). To assemble the flow system 73 a desired configuration for the flow system 73 (e.g., the layout of the high pressure components in the flow system 73) is determined. The actual distance between high pressure components to be coupled (e.g., the distance between fittings 43a and 43f) is then measured.

The actual distance between high pressure components to be coupled is a rough approximation of the length of tubing required to couple the components. That is, because the components are interconnected by welding a tube 65 therebetween, the variation in tube length associated with the welding process (i.e., welding variation due to shrinkage and other thermal effects) must be considered. Namely, the actual distance and any welding variation are used to compute an adjusted length between each high pressure component to be interconnected.

Thereafter to couple two high pressure components, a high pressure tube 65 having the appropriate adjusted length is welded to each of the two high pressure components. The above process is repeated for each of the high pressure components to be coupled (e.g., for fittings 43f and 43b, 43f and 43g, 43g and 43c, 43g and 43d, and 43d and 43e).

In this manner, the flow system 73 is easily assembled in any desired configuration; tolerancing is controlled within 0.0050 of an inch, and flow system assemblies may be compact and symmetrical. Because high pressure components are welded rather than screwed together, components are quickly and easily replaced as assemblies or weldments, eliminating joints that could cause leaks.

Accordingly, as described above, the present invention provides a significant advantage over conventional screw type high pressure fittings. In fact, in a typical flow system an $8,000 savings in material costs alone (without regard for reduced labor and downtime costs associated with assembly and repair) is experienced when the inventive fitting is substituted for the conventional threaded fittings described above.

The foregoing description discloses only the preferred embodiments of the invention, modifications of the above disclosed apparatus and method which fall within the scope of the invention will be readily apparent to those of ordinary skill in the art. Accordingly, while the present invention has been disclosed in connection with the preferred embodiments thereof, it should be understood that other embodiments may fall within the spirit and scope of the invention, as defined by the following claims.

The invention claimed is:

1. A system for conducting high pressure fluid from a source of high pressure fluid to a semiconductor processing chamber, the system having:
    a plurality of tubes through which the high pressure fluid flows; and
    at least one fitting body for connecting the tubes and changing a direction in which the fluid flows, the fitting body comprising:
        an outer surface;
        an inner surface;
        a passageway defined by the inner surface through which high pressure fluid is conducted, the passageway having at least a first end and a second end; and
        a material thickness between the inner and outer surfaces of the fitting body sufficient to withstand the forces exerted thereon by the chance of direction of the high pressure fluid, wherein the inner and outer surfaces of at least one of the first and second ends of the passageway are welding surfaces.

2. The apparatus of claim 1 wherein the inner and outer surfaces of both the first and second ends of the passageway are welding surfaces.

3. The apparatus of claim 2 wherein the passageway further comprises a third end wherein the inner and outer surfaces of the third end are welding surfaces.

4. The apparatus of claim 3 wherein the passageway further comprises a fourth end wherein the inner and outer surfaces of the fourth end are welding surfaces.

5. The apparatus of claim 1 wherein the passageway further comprises:
    a corner having an inner edge and an outer edge wherein the inner edge is rounded off.

6. The apparatus of claim 1 wherein the inner surface of at least one of the first and second ends is chamfered.

7. The apparatus of claim 1 wherein the passageway is electropolished.

8. The apparatus of claim 1, wherein at least one of the plurality of tubes is welded to the welding surfaces of the passageway.

9. The apparatus of claim 5, wherein at least one of the plurality of tubes is welded to the welding surfaces of the passageway.

10. The apparatus of claim 1 wherein the first end of the passageway is chamfered and has inner and outer surfaces that are welding surfaces; and wherein one of the plurality of tubes is welded to the first end of the passageway.

11. The apparatus of claim 1 wherein the first end of the passageway is chamfered and has inner and outer surfaces that are welding surfaces; and wherein one of the plurality of tubes has a first chamfered end welded to the first end of the passageway.

12. The apparatus of claim 11 wherein the first chamfered end of the tube and the chamfered end of the first end of the passageway form a "v".

13. The apparatus of claim 12 wherein the v is at least partially filled by a weld blob.

* * * * *